United States Patent Office 3,180,490
Patented Apr. 27, 1965

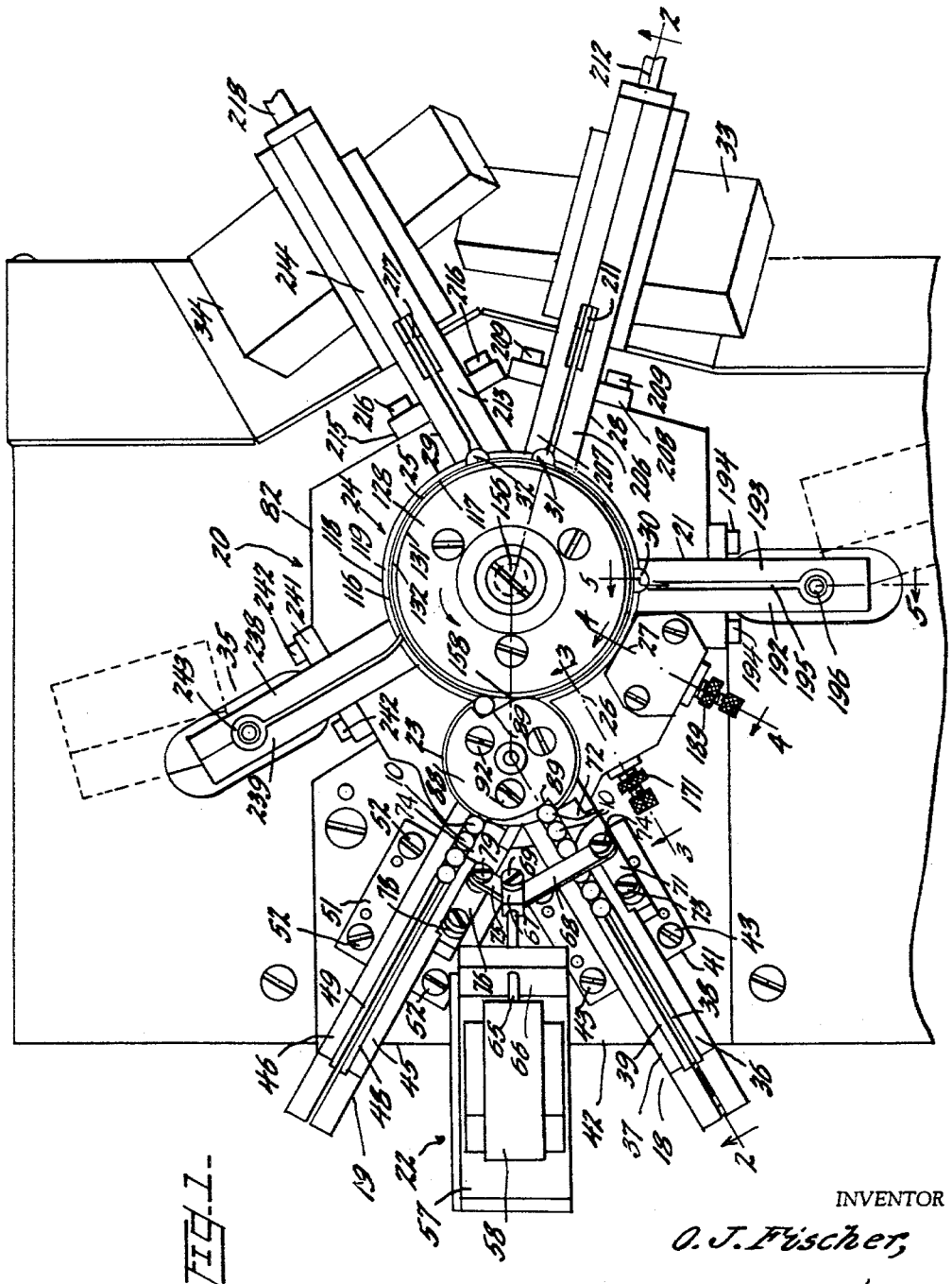

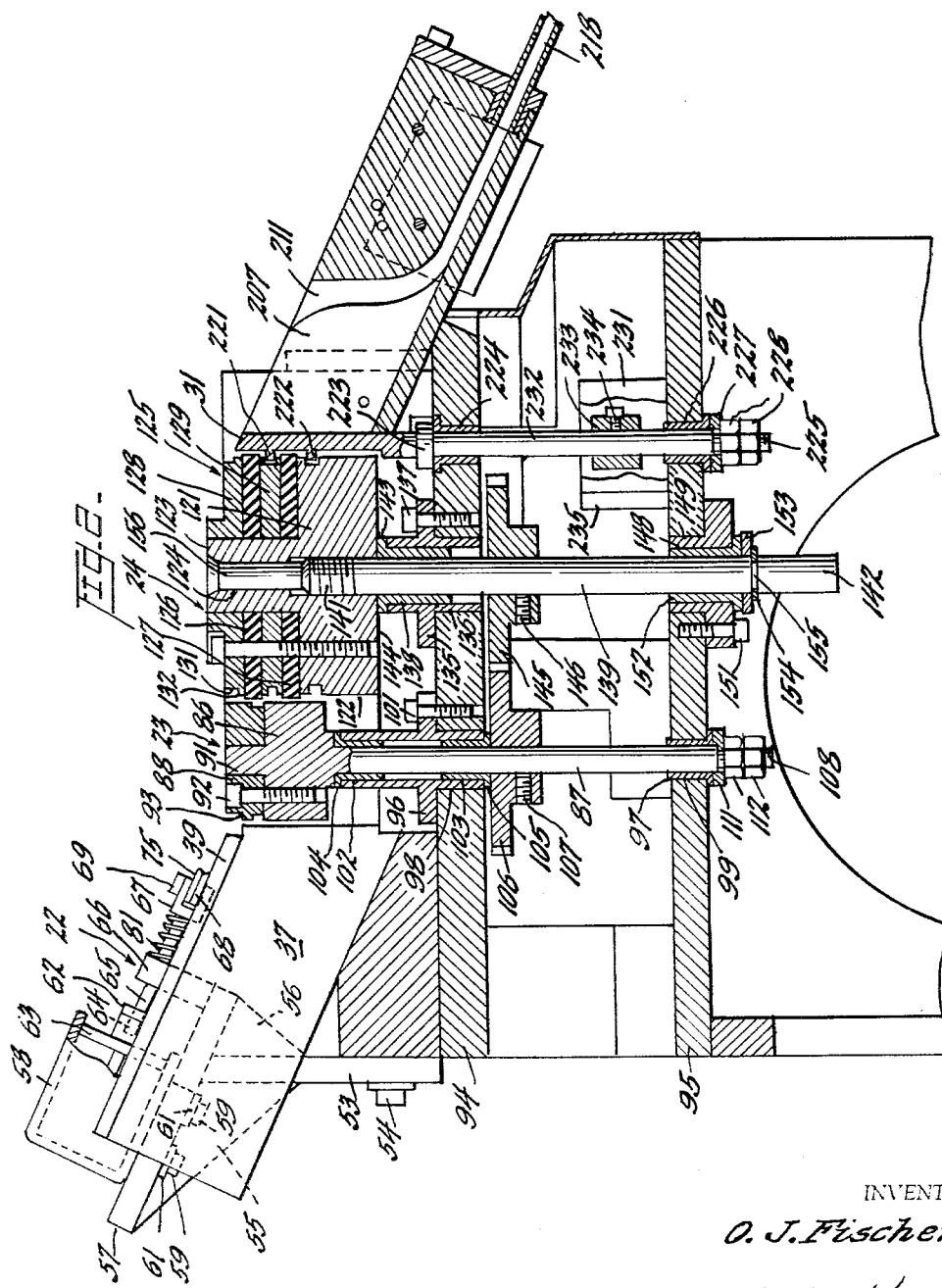

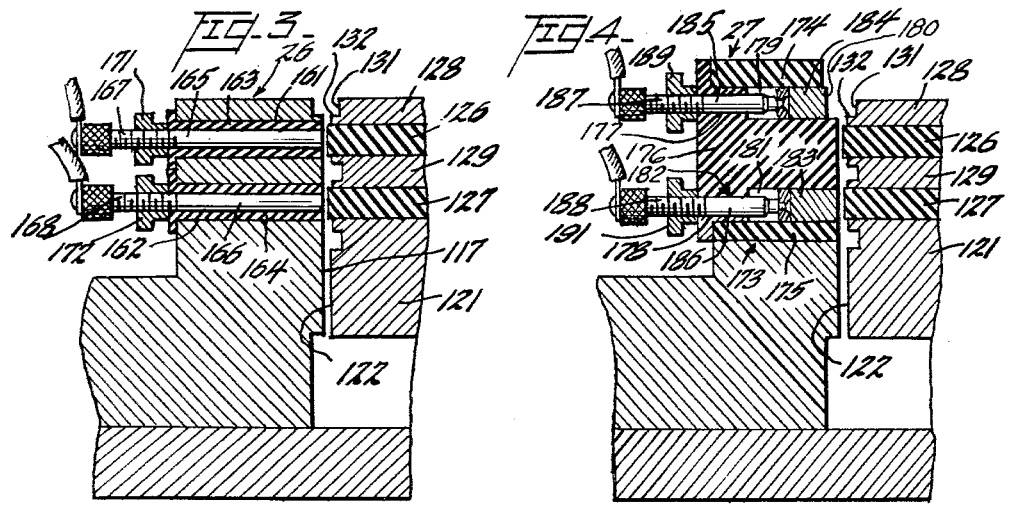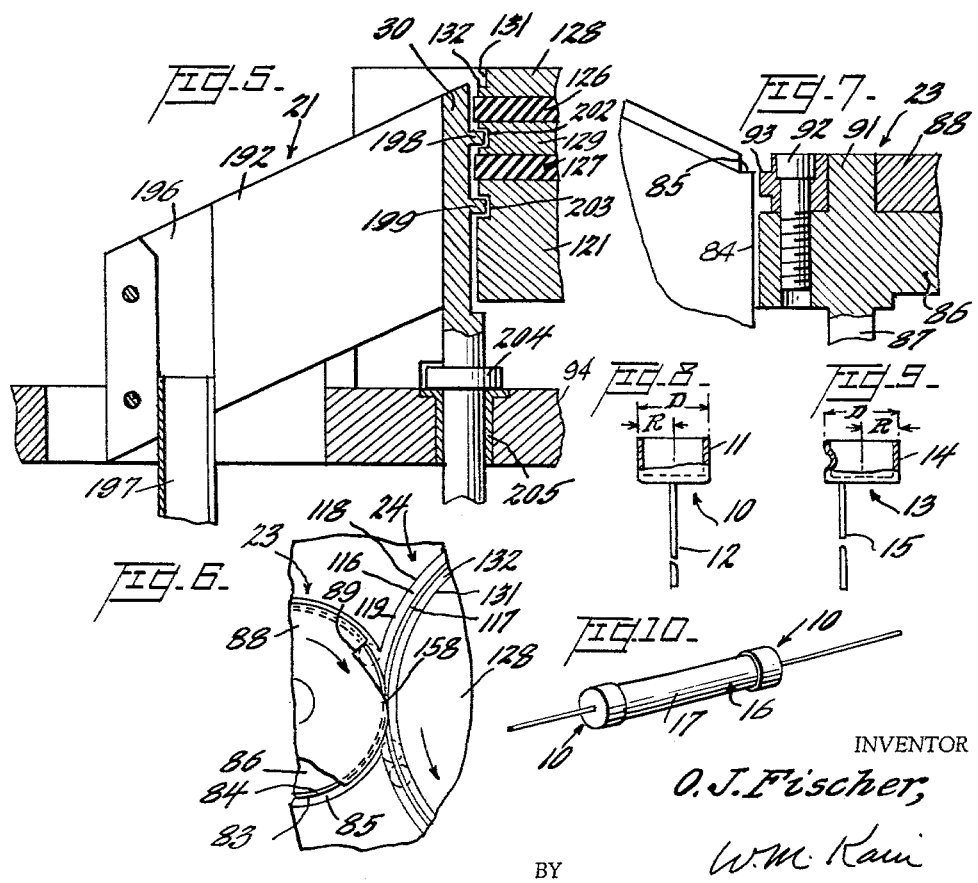

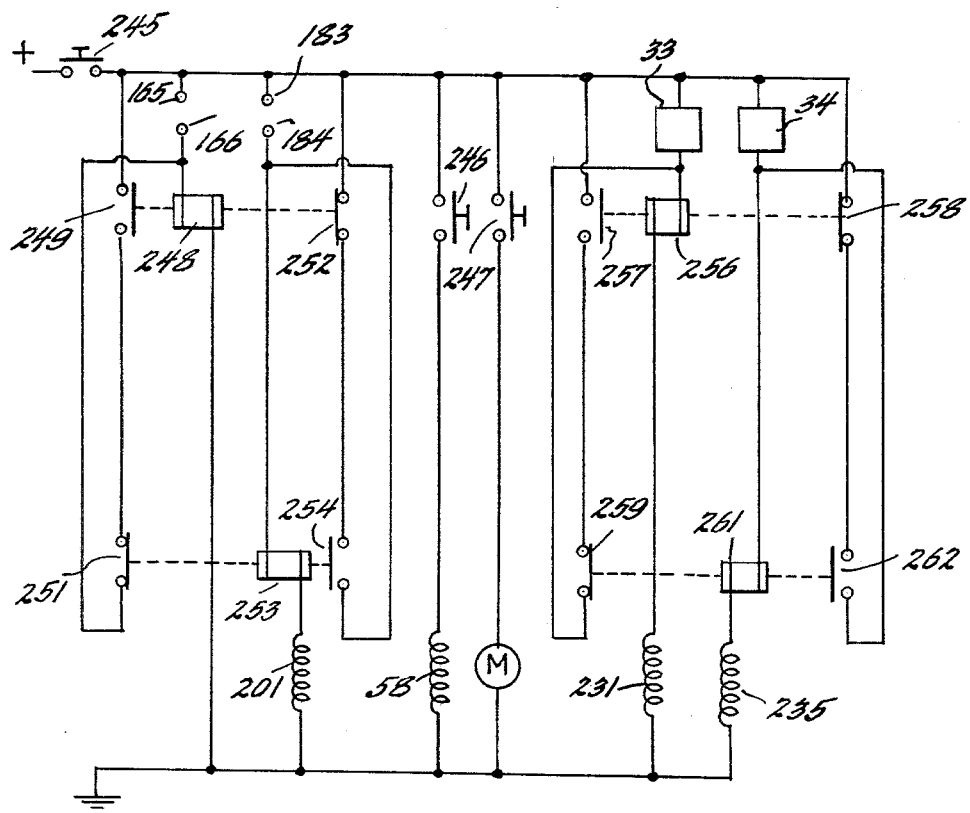

3,180,490
ECCENTRICITY TESTER
Oscar J. Fischer, Winston-Salem, N.C., assignor to Western Electric Company, Incorporated, New York, N.Y., a corporation of New York
Filed Dec. 5, 1962, Ser. No. 242,495
8 Claims. (Cl. 209—81)

This invention relates to an eccentricity tester and more particularly to a machine for determining the presence of an eccentric ferrule, i.e., a defective ferrule or one eccentrically mounted with respect to a depending lead.

In the automatic manufacture of electrical components, such as encapsulated resistors, it is necessary to provide concentric ferrules with leads depending from their centers to high speed assembly machines. In the past, visual inspection among other techniques has been employed to determine the presence of an eccentric ferrule. These methods, in view of the close tolerances maintained in high speed assembly machines, have not proved satisfactory. In order to alleviate this problem, it is necessary that an accurate testing machine be provided which is inexpensive, simple in design, but yet capable of accurately testing for eccentricity in a ferrule with respect to a depending lead.

It is a first object of the present invention to provide a new and improved testing machine for determining the presence of an eccentric ferrule with respect to a depending lead.

It is another object of the present invention to provide an eccentricity tester having facilities rendered effective by the presence of an eccentric ferrule for removing the eccentric ferrule from further advancement along a predetermined path.

It is still another object of the present invention to provide an eccentricity tester having instrumentalities for automatically discharging concentric ferrules alternately into two different paths.

It is a further object of the present invention to provide an automatic eccentricity tester which transfers ferrules from a supply source to a testing station wherein facilities are located for actuating a normally opened gate to remove eccentric ferrules from further advancement along a predetermined path and to permit concentric ferrules to advance along the path to a discharge station where instrumentalities alternately direct the ferrules into a pair of discharge tubes.

It is still a further object of the present invention to provide an eccentricity tester having spaced probes that sequentially actuate gating facilities upon sensing the presence of ferrules rotating and advancing along a path, wherein a normally opened gate is actuated to remove eccentric ferrules from further advancement along the path and concentric ferrules return the gate to its normally opened position and advance to discharge facilities.

With these and other objects in view, the present invention contemplates facilities for rotating and advancing a lead and ferrule along a predetermined path past testing facilities, for example, spaced testing stations including pairs of electrical probes, to a discharge device. A reject device may communicate with the path, such as a gate which is rendered effective upon the sensing of an eccentric ferrule at one of the testing stations to remove the eccentric ferrule and lead from further advancement along the path. The testing facilities may also include provisions at the other testing station for sensing the presence of the next lead and ferrule advancing along the path for returning the gate to its original position. A transfer mechanism may also be provided for sequentially delivering ferrules to the path from a pair of selectively operated supply chutes for advancement past the testing facilities to the discharge device which may alternately direct concentric ferrules into a pair of discharge tubes. Furthermore, a pick off tube may be provided for intercepting ferrules that escape the discharge device.

Other objects and advantages of the present invention will be apparent from the following detailed description when considered in conjunction with the accompanying drawings, wherein:

FIG. 1 is a plan view of an eccentricity tester constructed in accordance with the principles of the present invention, particularly illustrating a pair of supply chutes loaded with ferrules, and a pair of discharge chutes for accepting concentric ferrules.

FIG. 2 is a sectional view of the eccentricity tester taken along line 2—2 of FIG. 1, particularly showing a mechanism for transferring the ferrules from the supply chutes to instrumentalities for advancing the ferrules past testing stations to the discharge chutes;

FIG. 3 is a sectional view taken along line 3—3 of FIG. 1 illustrating a first pair of probes positioned to contact a lead depending from a ferrule advancing past a first testing station;

FIG. 4 is a sectional view taken along line 4—4 of FIG. 1 illustrating a second pair of probes positioned to contact a lead and eccentric ferrule advancing past a second testing station;

FIG. 5 is a sectional view taken along line 5—5 of FIG. 1 showing a closed gate having fingers extending across a predetermined path through which the ferrules are advancing for directing eccentric ferrules into a reject tube;

FIG. 6 is an enlarged view illustrating the point at which the transfer mechanism positions a ferrule to be picked up by a rotating drum to rotate and advance the ferrule along the path;

FIG. 7 is an enlarged view of the point of delivery between one of the supply chutes and the transfer mechanism;

FIG. 8 is a fragmentary sectional view of a concentric ferrule with a lead depending from its center;

FIG. 9 is a fragmentary sectional view of an eccentric ferrule partially crushed with a lead depending from a point spaced from its center;

FIG. 10 is a perspective view of an electrical component with a ferrule and lead on both ends; and FIG. 11 is a circuit diagram showing a control circuit for operating the mechanisms shown in the other figures.

Referring first to FIGS. 8 and 9 there is shown a concentric capped lead or article 10 comprising a ferrule 11 of radius R and diameter D with a lead 12 depending from its center. There is also shown a defective or eccentric capped lead or article 13 comprising a partially crushed eccentric ferrule 14 of radius R and diameter D with a lead 15 depending from a point spaced from the center of the ferrule. Referring now to FIG. 10, there is shown an electrical component 16 with a cylindrical body portion 17 with the articles 10 positioned on either end. The ferrules 11 although shown as cylindrical members, may be square, pentagonal, hexagonal, or some other regular geometric shape which is symmetrical with respect to its center.

Referring now to FIGS. 1 and 2, in general, the articles 10 are loaded into a pair of inclined supply chutes designated as 18 and 19, which are inclined toward a testing machine 20. A valve mechanism 22 is provided to alternately allow the article 10 to egress from the chutes 18 or 19 by gravity. The articles 10 are picked up by a transfer mechanism 23 and are delivered to a rotating drive generally designated as 24 that engages the leads 12 to rotate and advance the articles along an annular passageway or predetermined path 25.

The articles 10 are advanced along the path 25 past a first and a second testing station 26 and 27 to a pair of discharged chutes 28 and 29. A reject chute 21 for receiving eccentric articles 13 is positioned intermediate the testing station 27 and the discharge chute 28. A gate 30 is positioned in the entrance to the reject chute 21 and is normally opened to block the entrance to the reject chute. As an article 10 passes the first testing station 26, the presence of its lead 12 is sensed and appropriate circuits are energized to insure that gate 30 is in its normally opened position. As the article 10 advances past the second testing station 27, its ferrule 11 is rotated 360° while at the testing station. The presence of an eccentric ferrule 14 at the second testing station 27 energizes appropriate circuits which actuate a solenoid to rotate the gate 30 to preclude an eccentric article 13 from further advancement along the predetermined path 25 and direct the eccentric article into the reject chute 21.

A pair of gates 31 and 32 are positioned respectively in the entrances to the discharge chutes 28 and 29 for alternately directing concentric articles 10 into the discharge chutes. Photoelectric units 33 and 34 mounted adjacent the discharge chutes 28 and 29 serve to sense the presence of an article 10 in the chutes and to alternately actuate the gates 31 and 32. A pickoff tube 35 is provided to remove any article 10 which should escape both discharge chutes 28 and 29 from further advancement along the path 25.

Supply chutes

Referring to FIGS. 1 and 2, the supply chute 18 consists of a pair of plates 36 and 37 having stepped upper portions 38 and 39. The plates 36 and 37 are spaced apart a distance slightly greater than the diameter of the lead 12 of the article 10. The ferrules 11 rest on the stepped upper portions 38 and 39 with their leads 12 depending between the plates 36 and 37. The plates 36 and 37 are fixed to a support 41 and inclined toward the transfer mechanism 23 so that the articles 10 will descend down the chute 18 by gravity towards the transfer mechanism. The support 41 is secured to the surface 42 of the eccentricity testing machine 20 by screws 43.

Supply chute 19 is identical with supply chute 18 and also comprises a pair of spaced plates 45 and 46 having stepped upper portions 48 and 49, respectively. Articles 10 are placed in the chute 19 with ferrules 11 resting on the stepped upper portions 48 and 49 of the plates 45 and 46 with their leads 12 depending between the plates. The plates 45 and 46 are fixed to a support 51 and inclined toward the transfer mechanism 23 so that the articles 10 will descend down the chute 19 by gravity towards the transfer mechanism. The support 51 is also fixed to the surface 42 of the eccentricity testing machine 20 and held in place by screws 52.

Valve mechanism

Directing attention to the valve mechanism 22, there is shown a vertically extending bracket 53 (see FIG. 2) secured to the rear of the machine 20 by a bolt 54. A pair of wedge shaped members 55 and 56 extend from opposite sides of the bracket 53. The wedge shaped members 55 and 56 together with the bracket 53 form an upper surface on which is mounted a plate 57. The plate 57 is inclined at the same angle as that of the supply chutes 18 and 19 and supports a solenoid 58. Screws 59 extend through washers 61 and plate 57 to secure the solenoid 58 thereto.

A lock nut assembly 62 extends from an armature 63 of the solenoid 58 and receives the threaded end 64 of an actuating rod 65. The rod 65 extends through a guide plate 66 which is fixed to the plate 57 and has a bifurcated block 67 mounted on its end. A link 68 is pivotally secured in the bifurcated portion of the block 67 by a pivot screw 69. An arm 71 (FIG. 1) having a shoe 72 at one end is pivotally mounted by screw 73 at its other end to a rib extending from the plate 36. Plate 36 has the stepped upper portion 38 cut away at the end closest to the transfer mechanism 23 to accommodate the shoe 72. Link 68 extending from the bifurcated portion of the block 67 is pivoted to arm 71 by pivot screw 74 for moving the shoe 72 into and out of engagement with the ferrules 11 in the supply chute 18.

A link 75 (FIG. 1) is also pivotally mounted in the bifurcated portion of the block 67 by the pivot screw 69. An arm 76 having a shoe 77 is pivotally mounted at one end by pivot screw 78 to a rib extending from the plate 45. Plate 45 also has the stepped upper portion cut away at the end closest to the transfer mechanism 23 to accommodate shoe 77. The link 75 extending from the bifurcated portion of the block 67 is pivotally connected to the arm 76 by screw 79 for moving the shoe 77 into and out of engagement with the ferrules 11 in the supply chute 19.

A spring 81 shown in FIG. 2 is interposed between the guide plate 66 and the bifurcated block 67 to normally urge shoe 77 into pinching relationship with the ferrules 11 in chute 19 and to urge shoe 72 out of pinching relationship with the ferrules in chute 18 thereby normally precluding egress from chute 19 and permitting egress from chute 18. Upon energization of the solenoid 58, the armature 63 moves to the left against the force of spring 81 to move shoe 72 into pinching relationship with the ferrules 11 in chute 18 to preclude egress. As the rod 65 moves to the left, shoe 77 is also brought out of pinching relationship with the ferrules 11' in chute 19 to permit egress to the transfer mechanism 23.

Transfer mechanism

As shown in FIG. 1, the transfer mechanism 23 is positioned in a main housing 82 of the eccentricity testing machine 20. The housing 82 has a first cylindrical bore 83 having a cylindrical inner wall 84 terminating in an upper stepped portion 85 (see FIGS. 6 and 7). A first rotatable cylinder or drum 86 is positioned coaxially within the cylindrical bore 83 and has a depending drive shaft 87. An annulus 88 with peripheral recesses 89 is positioned about a hub 91 extending from the drum 86 and is held in place by shoulder screws 92. The annulus 88 is so dimensioned that its upper surface lies in the plane of the surface of the housing 82. The annulus 88 has a major diameter equal to that of the rotatable drum 86 and has upper stepped portions 93 forming the walls of the recesses 89, in alignment with the upper stepped portion 85 of the inner wall 84 of the housing 82. The rotatable drum 86 is spaced from the cylindrical inner wall 84 so that the leads 12 depending from the articles 10 may be advanced therethrough.

As shown in FIG. 2, located within the machine are a pair of spaced plates 94 and 95. Bearing sleeves 96 and 97 are positioned within aligned apertures 98 and 99 in the plates 94 and 95, respectively. Bearing sleeve 96 is secured to plate 94 by screw 101. A pair of spaced bushings 102 and 103 with flanged ends 104 and 105 surround the drive shaft 87 and are positioned within the bearing sleeve 96. A spur gear 106 mounted about the drive shaft 87 contacts the under side of the flange 105 of the bushing 103 and is held in place by a set screw 107. The lower end 108 of the drive shaft 87 extends through the bushing 97 and a washer 111 and is secured by nuts 112 to prevent vertical movement of the transfer mechanism 23.

As the drive shaft 87 is rotated by power transmitted through gear 106, the recesses 89 in the annulus 88 sequentially pass the supply chutes 18 and 19. As the recesses 89 pass an opened supply chute, the articles 10 egress into the recesses by gravity. The ferrules 11 then rest on the upper stepped portions 93 and 85 of the annulus 88 and the wall 84 of the housing 82 and are advanced along with their leads 12 depending between the drum 86 and the cylindrical wall.

*Main drive*

As shown in FIG. 1, the housing 82 has a second cylindrical bore 116 having an inner wall 117 terminating in an upper stepped portion 118 spaced from the inner wall by a horizontal ledge 119. A second drum or rotatable cylinder 121, also shown in FIGS. 2, 3, and 4, having a vertical or outer wall 122 is positioned coaxially within the bore 116. The cylinder 121 has a hub 123 and an aperture 124 extending therethrough. A composite annular member 125 is positioned about the hub 123 and comprises alternately stacked spaced annular rubber rings 126 and 127 and spacers 128 and 129. The top spacer 128 has a stepped upper portion 131 spaced from the outer wall 122 of the cylinder 121 by a horizontal ledge 132.

Referring to FIG. 2, the mounting for the rotatable cylinder 121 comprises a bearing sleeve 135 positioned in an aperture 136 in the plate 94 held in place by a screw 137. A bushing 138 is fitted about a drive shaft 139 which has a threaded end 141 and a smooth end 142. The bushing 138 which rides in the bearing 135 has an upper flanged end 143 which contacts the under side 144 of the cylinder 121. A spur gear 145 is spaced from the plate 94 and positioned about the shaft 139. The spur gear 145 is held in place by a set screw 146 and engages the spur gear 106 for transmitting power to the transfer mechanism 23. A bearing sleeve 148 is positioned in an aperture 149 in the plate 95 and held in place by a screw 151. The lower end 142 of the drive shaft 139 is inserted in a bushing 152 which rides in the bearing 148. A washer 153 is positioned beneath the bushing 152 and is held in place by a snap ring 154 resiliently engaged in a groove 155 in the drive shaft 139. The lower end 142 of the drive shaft 139 extending below the snap ring 154 accommodates a connection from a driving motor (not shown) for transmitting power to the drive shafts 139 and 87. The threaded end 141 of the drive shaft 139 is threadedly secured in the aperture 124 in the cylinder 121. A stop screw 156 is inserted into the aperture 124 in the cylinder 121 and is threaded into the top of the drive shaft 139 to lock the shaft in the aperture.

As shown in FIGS. 2, 3, and 4, the outside diameters of the rubber annuli 126 and 127 are greater than the outside diameter of the cylinder 121 which defines the vertical or outer wall 122. The outer wall 122 is spaced from the inner wall 117 a distance slightly greater than the diameters of the leads 12 to form the predetermined path 25 through which the leads may be advanced. The ferrules 11 rest on the horizontal ledges 119 and 132 with their leads 12 depending into the predetermined path 25. The rubber annuli 126 and 127 extend sufficiently beyond the outer wall 122 to contact the leads 12 in the predeterminad path 25 and impart rotation to the leads to advance and rotate the leads and ferrules 11 along the predetermined path.

Referring now to FIGS. 1 and 6, the ferrules 11 in the peripheral recesses 89 of the annulus 88 of the transfer device 23 are advanced to the transfer point 158 where the rubber annuli 126 and 127 contact the leads 12 as the leads enter the predetermined path 25 and begin to rotate and advance the leads along the path.

*Testing stations*

Referring now to FIG. 3, there is shown the first testing station 26. The housing 82 has a pair of horizontally extending bores 161 and 162 which terminate at the inner wall 117 of the cylindrical bore 116 and are in alignment one above the other in a vertical plane. A pair of insulating sleeves 163 and 164 extend into the bores 161 and 162 and terminate at the inner wall 117. A pair of contacts or probes 165 and 166 are positioned within the insulating sleeves 163 and 164 and also terminate at the inner wall 117 or slightly beyond for engaging the advancing leads 12 of the articles 10 within the path 25. The outer ends 167 and 168 of the contacts 165 and 166 are threaded and receive adjusting nuts 171 and 172 for positioning the contacts 165 and 166 either at the inner wall 117 or slightly beyond in the path 25.

Referring to FIG. 4, there is shown the second testing station 27. The housing 82 is partially cut away in the vicinity of the second testing station 27, and replaced by an insulating block assembly 173. The assembly 173 consists of a pair of rectangular insulating members 174 and 175 positioned on opposite sides of a symmetrical insulating block 176 having horizontally extending bores 177 and 178 to form enlarged horizontally-extending canals 179 and 181. The horizontally-extending bores 177 and 178 and canals 179 and 181 are positioned one above the other in vertical alignment. Mounted in the bore 177 and canal 179 is a first probe 180 including a contact 184 and an actuating rod 185. Mounted in the bore 178 and canal 181 is a second probe 182 including a contact 183 and an actuating rod 186. The lower canal 181 houses the contact 183 for engaging the lead 12 of an advancing article 10. The upper canal 179 houses the contact 184 positioned a distance greater than the radius R of the ferrule 11 from the path 25 and less than the diameter D of the ferrule for contacting the eccentric ferrules 14 which may be advancing along the path. The electrically conductive actuating rods 185 and 186 are slidably mounted within the bores 177 and 178 for imparting movement to the contacts 183 and 184. The rods 185 and 186 have threaded outer ends 187 and 188 that receive a pair of adjusting nuts 189 and 191 for selectively positioning the lower contact 183 either at the inner wall 117 or within the path 25 and the upper contact 184 a distance greater than the radius R and less than the diameter D of the ferrule 11 from the wall for contacting an eccentric ferrule 14.

*Reject chute*

Referring now to FIGS. 1 and 5, there is shown the reject chute 21. The reject chute 21 comprises a pair of spaced plates 192 and 193 secured to the housing 82 by screws 194 and positioned at an incline away from the path 25. The plates 192 and 193 define a trough 195 which terminates in a circular opening 196 which leads into a reject tube 197.

The gate 30 positioned at the entrance to the trough 195 is identical to the gate 31 shown in FIG. 2. The gate 30 is shown in FIG. 5 with its teeth 198 and 199 extending across the path 25 into annular recesses 202 and 203 in the spacer 129 and cylinder 121 for precluding advancement of an eccentric ferrule 14 moving along the path. The teeth 198 and 199 intercept the lead 15 and direct the ferrule 14 into the reject chute 21. Upon entering the reject chute 21, the ferrule 14 slides down the inclined plates 192 and 193 by gravity with its lead 15 depending into the trough 195 and into the reject tube 197.

The gate 30 has a collar 204 which rests on a bearing 205 positioned in the plate 94 and is actuated by a solenoid 201 (only shown in FIG. 11) which is identical to the solenoids which operate gates 31 and 32, subsequently to be described.

The gate 30 is normally opened and blocks the entrance to the reject chute 21 to allow concentric ferrules 11 to continue to advance along the path 25 toward the discharge chutes 28 and 29. Considering an article 10 rotating and advancing along the path 25, its lead 12 will engage the contacts 165 and 166 at the first testing station 26 to insure that the gate 30 will be in its normally opened position. As the article 10 passes the second testing station 27, its lead 12 will engage the lower contact 183 and its ferrule will rotate 360° as it advances past the upper contact 184. If the ferrule is concentric, it will not engage the upper contact 184 and no circuit will be closed, thereby leaving the gate 30 in its normally opened position. If the ferrule is crushed, bent, or in some way eccentric with respect to its lead, it will engage the upper contact 184 and close a circuit which energizes the solenoid 201 to rotate the gate 30 and position its teeth 198 and 199 in the recesses 202 and 203. The lead 15 of the eccentric ferrule 14 will then abut against the teeth 198 and 199 and be directed into the reject chute 21.

*Discharge chutes*

Directing attention again to FIGS. 1 and 2, the discharge chutes 28 and 29 are shown. Discharge chute 28 comprises a pair of spaced parallel plates 206 and 207 inclined away from the path 25 and mounted on the housing 82 of the machine 20 by a bracket 208 and screws 209. The gate 31 is positioned at the entrance to the chute 28 to either block the entrance or direct concentric ferrules 11 into the chute. The ferrules 11 rest on the tops of the plates 206 and 207 with their leads 12 depending into the space between the plates. Partway down the discharge chute 28 is an enlarged opening 211 into which a ferrule 11 sliding down the discharge chute drops and is directed into a suction discharge tube 212. A photoelectric unit 33, shown in FIG. 1, projects a beam of light across the entrance to the tube 212 in order to sense the presence of the article 10.

Similarly, discharge chute 29 comprises a pair of spaced parallel plates 213 and 214 inclined away from the path 25 and fixed to a support bracket 215 that is held on the housing 82 by screws 216. A gate 32 is positioned at the entrance to the discharge chute 29 and may be rotated to block the entrance to the chute or to direct ferrules 11 into the chute. The plates 213 and 214 are spaced apart so that an article 10 entering the discharge chute 29 has its ferrule 11 ride on the top surface of the plates with its lead 12 depending into the space between the plates. Part way down the chute 29 the plates 213 and 214 have an enlarged opening 217 for accepting and guiding the ferrule 11 into a suction discharge tube 218. A photoelectric unit 34, shown in FIG. 1, projects a beam of light across the entrance to the tube 218 in order to sense the presence of the article 10.

The gates 30, 31, and 32 are identical. The gate 31, as shown in FIG. 2, at the entrance to the discharge chute 28 has a pair of teeth 221 and 222 that enter into the recesses 202 and 203 in the spacer 129 and drum 121. The gate 31 has a collar 223 that rests on a bearing 224 positioned in the support plate 94. The lower end 225 of the gate 31 extends through a bearing 226 positioned in the lower support plate 95. A washer 227 is placed over the end 225 of the gate 31 and is held in place by nuts 228.

A solenoid 231 is seated on the support plate 95 in front of a shaft 232 which extends from the gate 31, as viewed in FIG. 2. A sleeve 233 is secured about the shaft 232 by a set screw 234 and is mechanically linked to the armature of the solenoid 231. Similarly, the gate 32 is actuated by a solenoid 235 which is seated on the support plate 95 behind the gate 32, as viewed in FIG. 2, acting through a sleeve secured to a shaft extending from the gate (not shown). There is a linkage (not shown) interconnecting the solenoid so that as solenoids 231 is actuated to close gate 31, the linkage automatically opens gate 32 and when the solenoid 235 is actuated to close gate 32, gate 31 is opened. The mechanically linked solenoids 231 and 235 together with the photoelectric units 33 and 34 serve to alternately direct ferrules 11 into the discharge chutes 28 and 29.

When a ferrule 11 that is in discharge chute 28 passes the photoelectric unit 33, solenoid 231 is energized to open the gate 31 and the mechanical linkage closes the gate 32. The next ferrule 11 advancing along the path 25 is directed by gate 32 into discharge chute 29. As the ferrule 11 passes the photoelectric unit 34 associated with discharge chute 29, the solenoid 235 is energized to open a gate 32 and the mechanical linkage closes gate 31 to position it to intercept the next ferrule. Thus, the ferrules 11 are alternately directed into the discharge chutes 28 and 29.

*Pickoff tube*

As a safety measure to protect the machine from jamming, the pickoff tube 35 is provided. The pickoff tube comprises a pair of spaced plates 238 and 239 which terminate in the path 25. The plates 238 and 239 are inclined away from the path 25 and are supported by a bracket 241 which is fixed to the housing 82 by screws 242. A ferrule 11 which through some failure in the discharge tube mechanism has passed both gates 31 and 32, is intercepted by the pickoff tube 35 and travels down the inclined plates 238 and 239 and out through an enlarged opening 243 into a bin. The pickoff tube 35 thus prevents any chance of the machine jamming at the point of transfer 158 from the transfer mechanism 23 to the annular path 25.

*Operation*

Considering the operation of the eccentricity testing machine 20 in accordance with the circuits shown in FIG. 11, switch 245 is first closed to energize the circuits that control the machine. Considering chute 18 to be empty, switch 246 is closed to energize solenoid 58 which acts through rod 65 and the appropriate linkages to remove shoe 77 from pinching engagement with the ferrules 11 in supply chute 19. Switch 247 is next closed to energize the motor M (only shown in FIG. 11) which powers the transfer mechanism 23 and the rotating drive 24. The ferrules 11 now egress from the supply chute 19 and are picked up by the peripheral recess 89 in the transfer mechanism 23 and carried to the path 25.

As the ferrules 11 enter the path 25, their leads 12 are engaged and rotated to advance the ferrules 11 along the path. As the ferrules 11 pass the first testing station 26, their leads 12 engage the contacts 165 and 166 and energize relay 248 to close contacts 249 and establish a first holding circuit through contacts 249, 251, and relay 248. Relay 248 also opens contacts 252 which will remain open as long as the first holding circuit is completed to keep solenoid 201 in a deenergized state and thus keep gate 30 in its normally opened position.

Considering now, the presence of an eccentric article 13 at the second testing station 27, the lead 15 will engage contact 183 and the eccentric ferrule 14 will engage contact 184 as it is rotated 360° past the contact 184. The closing of contacts 183 and 184 energizes relay 253 and solenoid 201. The solenoid 201 now through appropriate linkages turns gate 30 to position the teeth 198 and 199 across the path 25 to intercept and direct the eccentric ferrule 14 into the reject chute 21. Relay 253 opens contacts 251 and closes contacts 254. The opening of contacts 251 deenergizes relay 248 which causes contacts 249 to be opened and contacts 252 to be closed. A second holding circuit is now established through contacts 252, 254, relay 253, and solenoid 201. The gate 30 will now remain closed until another lead engages the first set of contacts 165 and 166 at the first testing station 26.

With gate 31 closed, and gate 32 opened, a concentric article 10 advancing towards the discharge chutes 28 and 29 will be directed by gate 31 into discharge chute 28. As the article 10 advances down the discharge chute 28, it passes the photoelectric unit 33 which energizes relay 256 and solenoid 231. Solenoid 231 upon energization actuates appropriate linkages to rotate gate 31 to the opened position and gate 32 to the closed position. The energization of relay 256 causes contacts 257 to close and contacts 258 to open. A holding circuit is now established through contacts 257, 259, relay 256 and solenoid 231.

The next advancing ferrule 11 passes gate 31 and is intercepted by gate 32 and directed into discharge chute 29. As the ferrule 11 moves through the discharge chute 29, it passes photoelectric unit 34 which energizes relay 261 and solenoid 235. The energization of solenoid 235 causes linkages to be actuated that rotate gate 32 to the open position and gate 31 to the closed position. The energization of relay 261 closes contact 262 and opens contacts 259. When contacts 259 are opened, relay 256 is deenergized, thus closing contacts 258 and opening contacts 257. Another holding circuit is now established through contacts 258, 262, relay 261 and solenoid 235. Thus, it can be seen that the ferrules 11 are alternately directed into the discharge chutes 28 and 29.

It is to be understood that the above-described arrangements of apparatus, circuits, and construction of elemental parts are simply illustrative of an application of the principles of the invention and many other modifications may be made without departing from the invention.

What is claimed is:

1. In an apparatus for testing a cylindrical ferrule of radius R and diameter D for eccentricity with respect to a depending lead,
   a housing having a vertical wall terminating in an upper horizontally disposed wall,
   a rotatable drive element for holding said lead against said vertical wall and said ferrule over said horizontal wall,
   a movable probe mounted on said housing and extending toward said vertical wall,
   means for positioning said probe a distance greater than R and less than D from said vertical wall,
   means for rotating said drive element to rotate the lead and ferrule on its longitudinal axis and advance said lead and ferrule along said vertical and horizontal walls, respectively, and
   means rendered effective by said probe contacting an eccentric ferrule for precluding said ferrule from further advancement along said vertical wall.

2. In an apparatus for testing a ferrule of a radius R and diameter D for eccentricity with respect to a depending lead,
   a housing having a first vertical wall and a horizontal wall terminating to form a first edge,
   a second vertical wall and horizontal wall terminating in a second edge spaced from said first edge a distance greater than the diameter of said lead, said ferrule supported by at least one of said edges with said lead depending between said vertical walls,
   a probe mounted on said housing parallel to and above said first horizontal wall and extending toward said first edge,
   means for positioning said probe a distance greater than R and less than D from said first edge,
   means mounted on said second vertical wall and extending between said vertical walls for engaging and rotating said lead to rotate and advance said ferrule past said probe 360 degrees, and
   means rendered effective by said probe contacting an eccentric ferrule for precluding said ferrule from further advancement along said first wall.

3. In an apparatus for testing a cylindrical ferrule of radius R and diameter D for eccentricity with respect to a depending lead,
   a housing having a vertical wall terminating in an upper horizontally disposed wall for supporting said ferrule,
   a rotatable drive element for holding said lead against said vertical wall and said ferrule projecting over said horizontal wall,
   a fixed probe mounted in said housing extending toward and terminating at said vertical wall for contacting said lead,
   a movable probe mounted on said housing vertically above said fixed probe and said horizontal wall and extending toward said vertical wall,
   means for positioning said movable probe a distance greater than R and less than D from said vertical wall,
   means for rotating said drive element to rotate and advance said lead and ferrule along said vertical and horizontal walls, respectively, and
   means rendered effective by said probe contacting a lead and said movable probe contacting an eccentric ferrule for precluding said lead and eccentric ferrule from further advancement along said walls.

4. An apparatus for determining eccentricity of a ferrule having a lead depending therefrom comprising
   a housing having a vertically-disposed wall terminating in an upper horizontal surface for supporting the underside of said ferrule,
   a probe positioned on said housing and extending toward said wall for contacting an eccentric ferrule,
   means for holding said lead against said wall and for rotating said lead to advance said lead along said wall and said ferrule along said horizontal surface past said probe, and
   reject means rendered effective by said probe contacting an eccentric ferrule for precluding said eccentric ferrule from further advancement along said surface.

5. In an apparatus for testing for a defective condition in a capped lead,
   a housing having a cylindrical inner wall,
   a cylindrical drum mounted for rotation coaxially within said cylindrical inner wall for forming an annular passageway to receive said lead,
   testing means mounted in said housing and terminating at said inner wall for contacting said capped lead to sense the presence of the defective condition in said capped lead,
   a reject tube adjacent to said passageway,
   gating means selectively rendered effective by said testing means for directing a defectively capped lead into said reject tube from said annular passageway, and
   means for rotating said cylindrical drum to roll said capped leads along the inner wall of said housing.

6. In an eccentricity determining apparatus for testing an article having a lead depending from a ferrule,
   a housing having an inner cylindrical wall,
   a rotatable drum having an outer cylindrical wall mounted coaxially with said inner wall and defining an annular passageway,
   transfer means for delivering said article to said passageway,
   receiving means for accepting eccentric articles,
   a first pair of electrical probes mounted in said housing intermediate said transfer means and receiving means in a vertical plane one above the other and terminating at said inner wall for contacting said lead,
   a second pair of electrical probes mounted in said housing intermediate said first pair of probes and said receiving means in a vertical plane one above the other, the lower probe positioned for contacting said lead and the upper probe positioned for contacting an eccentric ferrule,
   a gate interposed between said annular passageway and said receiving means for directing eccentric ferrules into said receiving means,
   means rendered effective by said lead contacting said first pair of probes for actuating said gate to block said receiving means,
   said means rendered effective upon said lead and an eccentric ferrule contacting said second pair of probes for actuating said gate to direct eccentric articles into said receiving means,
   means mounted on said rotatable drum and extending into said annular passageway for contacting said lead to impart rotation to said ferrule, and
   means for rotating said drum to rotate and advance said leads along said annular passageway.

7. An apparatus for determining eccentricity of a ferrule having a lead depending therefrom comprising;
- a housing having a vertically-disposed wall terminating in an upper horizontal surface for supporting the underside of said ferrule,
- a first pair of probes positioned on said housing and extending toward said wall for contacting said lead,
- a second probe positioned on said housing and extending toward said wall for contacting an eccentric ferrule,
- means for holding said lead against said wall and for rotating said lead to advance said lead in a path along said wall and said ferrule along said horizontal surface past said first and second probes,
- reject means positioned adjacent said path,
- means rendered effective by said first pair of probes contacting said lead for precluding entry of said ferrule and lead into said reject means, and
- said reject means rendered effective by said second probe contacing an eccentric ferrule for precluding said eccentric ferrule from further advancement along said surface.

8. An apparatus for determining eccentricity of a ferrule having a lead depending therefrom comprising;
- a housing having a vertically-disposed wall terminating in an upper horizontal surface for supporting the underside of said ferrule,
- transfer means for delivering said ferrule to said horizontal surface,
- a probe positioned on said housing and extending toward said wall for contacting an eccentric ferrule,
- means for holding said lead against said wall and for rotating said lead to advance said lead along said wall and said ferrule along said horizontal surface past said probe,
- reject means rendered effective by said probe contacting an eccentric ferrule for precluding said eccentric ferrule from further advancement along said surface,
- first and second discharge means for receiving an acceptable ferrule passing said reject means,
- first and second means for directing ferrules alternately into said first and second discharge means,
- means rendered effective by said ferrule for conditioning said first and second means to alternately direct said articles into said discharge means, and
- pick off means communicating with the horizontal surface of said vertically-disposed wall for receiving articles passing said first and second discharge means.

References Cited by the Examiner
UNITED STATES PATENTS

| 2,542,090 | 2/51 | Lorenz | 209—82 |
| 2,692,713 | 10/54 | Silva | 198—31.3 X |
| 2,999,587 | 9/61 | Campbell | 209—73 |

References Cited by the Applicant
UNITED STATES PATENTS

| 826,210 | 7/06 | Witt. |
| 2,353,813 | 7/44 | Deeren. |
| 2,601,514 | 6/52 | Goodban. |
| 2,634,489 | 4/53 | Root. |
| 2,689,647 | 9/54 | Hofstetter et al. |
| 3,101,848 | 8/63 | Uhlig. |

ROBERT B. REEVES, *Acting Primary Examiner.*